US008272873B1

(12) United States Patent
Keller

(10) Patent No.: US 8,272,873 B1
(45) Date of Patent: Sep. 25, 2012

(54) LANGUAGE LEARNING SYSTEM

(75) Inventor: Timothy Keller, Albuquerque, NM (US)

(73) Assignee: Progressive Language, Inc., Tempe, AZ (US)

( * ) Notice: Subject to any disclaimer, the term of this patent is extended or adjusted under 35 U.S.C. 154(b) by 3077 days.

(21) Appl. No.: 09/976,775

(22) Filed: Oct. 12, 2001

Related U.S. Application Data

(60) Provisional application No. 60/241,130, filed on Oct. 16, 2000.

(51) Int. Cl.
*G09B 11/00* (2006.01)

(52) U.S. Cl. .......................................... 434/169; 434/156

(58) Field of Classification Search ........... 434/156–185
See application file for complete search history.

(56) References Cited

U.S. PATENT DOCUMENTS

| | | | |
|---|---|---|---|
| 4,731,021 A * | 3/1988 | Chan .............................. | 434/156 |
| 5,065,345 A | 11/1991 | Knowles et al. ............... | 395/154 |
| 5,146,405 A | 9/1992 | Church ......................... | 364/419 |
| 5,273,433 A | 12/1993 | Kaminski et al. ............. | 434/169 |
| 5,283,737 A | 2/1994 | Van Praag ....................... | 364/12 |
| 5,606,498 A | 2/1997 | Maruta et al. ................. | 395/757 |
| 5,649,826 A * | 7/1997 | West et al. .................... | 434/157 |
| 5,735,693 A | 4/1998 | Groiss ........................... | 434/157 |
| 5,794,050 A | 8/1998 | Dahlgren et al. ............. | 395/708 |
| 5,810,599 A | 9/1998 | Bishop .......................... | 434/157 |
| 5,820,386 A | 10/1998 | Sheppard, II ................. | 434/322 |
| 5,882,202 A | 3/1999 | Sameth et al. ................ | 434/157 |
| 5,888,071 A * | 3/1999 | Takamori ...................... | 434/156 |
| 5,957,693 A * | 9/1999 | Panec ............................ | 434/178 |
| 6,077,085 A | 6/2000 | Parry et al. ................... | 434/322 |
| 6,119,114 A | 9/2000 | Smadja ............................ | 707/7 |
| 6,157,913 A | 12/2000 | Bernstein ..................... | 704/275 |
| 6,167,368 A | 12/2000 | Wacholder ....................... | 704/9 |
| 6,167,398 A | 12/2000 | Wyard et al. .................... | 707/5 |
| 6,188,976 B1 | 2/2001 | Ramaswamy et al. ........... | 704/9 |
| 6,224,383 B1 | 5/2001 | Shannon ....................... | 434/156 |
| 6,261,101 B1 * | 7/2001 | Benitz et al. ................. | 434/167 |
| 6,482,011 B1 * | 11/2002 | Lee et al. ...................... | 434/157 |

* cited by examiner

*Primary Examiner* — Kathleen Mosser
(74) *Attorney, Agent, or Firm* — Jeffrey D. Myers; Justin R. Jackson; Peacock Myers, P.C.

(57) ABSTRACT

Computer software for language analysis and material design, and a method of natural language training, comprising: receiving a plurality of texts in a predetermined natural language; establishing one or more groups of core words of the natural language; and compiling teaching materials that comprise at least a predetermined percentage of words that are within one or more of the groups. At least one of the groups comprises high frequency words in the natural language.

24 Claims, 15 Drawing Sheets

Progressive Language, Inc. Courses
Progressive Language Lessons

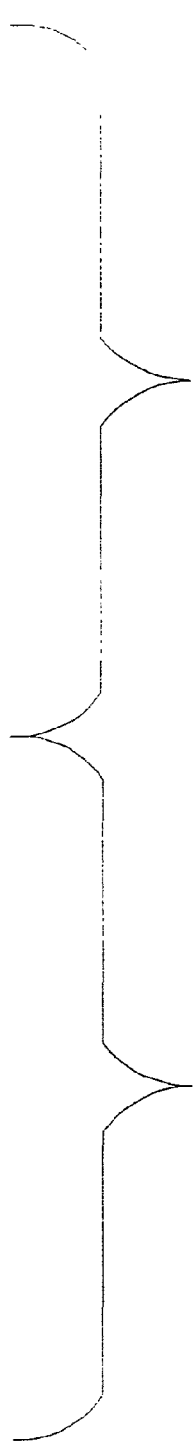

Course 1
Lessons 1 - 10
Progressive Introduction of
Progressive Language Core
Material to Achieve 75%
Comprehension

- Audio, Video and Printed Study Guide
- Dialog Based Lessons
- Vocabulary Building Exercises
- Verb Conjugation
- Grammar
- Common Phrases and Slang

Course 2
Lessons 11 - 20
Supplemental Material to
Achieve 95 % Comprehension

- Audio, Video and Printed Study Guide
- Dialog Based Lessons
- Vocabulary Building Exercises
- Verb Conjugation
- Grammar
- Common Phrases and Slang
- Business, Travel, and Home Life modules.
- Monthly Newsletter

Fig. 5

Directory and Subdirectory Article Analysis and
Database Building Using LUAT

| File | Edit | View | Analysis | Utilities | Help |
|---|---|---|---|---|---|
| Set Default DB | Edit Mapping List | Occurrence Graph | Article Analysis | Combine Articles | About |
| Create New DB | Edit Phrase | Compliance Graph | Insert Article | | |
| Clear DB | Build Vocabulary DB | Sort Articles By: Title Article No Word No. Source Author | Directory Analysis | | |
| Remove DB | Out Vocabulary DB | Sort Words By: Word Occurrence Rank Article No. | Database Comparison | | |
| Select DB | Update Mapping DB | | Select Core | | |
| Select List | Save Mapping DB to File | | Highlight | | |
| Save DB | Update Phrase DB | | | | |
| Print List | Save Phrase DB to File | | | | |
| Print Article DB | | | | | |
| Print Core Words | | | | | |
| Exit | | | | | |

Fig. 15

LANGUAGE LEARNING SYSTEM

CROSS-REFERENCE TO RELATED APPLICATIONS

This application claims the benefit of the filing of U.S. Provisional Patent Application Ser. No. 60/241,130, entitled "Language Learning System", filed on Oct. 16, 2000, and the specification thereof is incorporated herein by reference.

COPYRIGHTED MATERIAL

A portion of the disclosure of this patent document and of the related application listed above contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention (Technical Field)

The present invention relates to systems for human learning of natural languages and human language analysis.

2. Background Art

Second language instruction is often taught in a prescribed linear fashion—introducing verb tenses one after another, long lists of vocabulary and grammar exercises. However, children learn their first language by daily immersion at home or in other informal contexts, by understanding the spoken language and eventually speaking; reading, writing, and grammar study are done in formal school contexts. Language learning methodologies have historically utilized teaching methodologies based on educational norms, rather than language usage norms. Given the empirical information available from corpus linguistic research (cf. Biber, *Variation Across Speech and Writing*, 1988; Biber et al., Longman *Grammar of Spoken and Written English*, 1999), the English language can be much more accurately described and predicted in terms of the frequency, co-occurrence, and distribution of a wide variety of linguistic structures in relation to their context of use. This information opens the door for language instruction that is based on actual use of the language, not on language teacher intuition or educational notions of simplicity, complexity, or learning order.

The prior art develops language learning materials such as: books, CD-ROMs, or audio tapes that are static over time or that focus on a very specific aspect of learning (pronunciation for example). Even Internet based language learning materials are mostly static. Additionally, there is no emphasis on a "language core" developed by analyzing modern language usage and creating programs to introduce are this material on a systematic basis. Recent work in corpus linguistics (see Biber et al., 1999) has identified key linguistic characteristics associated with different types of language usage, but a systematic methodology for utilizing the results of corpus linguistics has not been developed.

The teaching of second (or third or higher) natural languages to persons is ordinarily a haphazard affair, especially when the person to be trained is interested particularly in gaining both a base familiarity with the language as well as specific familiarity with a subject area or areas (e.g., computer science or contract law). The present invention provides a means for developing a systematic curriculum.

Prior art generally relevant to the present invention includes: U.S. Pat. No. 6,224,383, entitled "Method and system for computer assisted natural language instruction with distracters", discloses use of automatic speech recognition to help with pronunciation. U.S. Pat. No. 6,157,913, entitled "Method and apparatus for estimating fitness to perform tasks based on linguistic and other aspects of spoken responses in constrained interactions", discloses voice recognition that determines a users "fitness" to perform a task. U.S. Pat. No. 6,077,085, entitled "Technology assisted learning", discloses a system that tailors learner activities based on feedback from learners, with a computerized database of language elements to be learned. U.S. Pat. No. 5,882,202, entitled "Method and system for aiding foreign language instruction", discloses use of audio/visual materials with stories broken into segments and having a dictionary mode. U.S. Pat. No. 5,810,599, entitled "Interactive audio/visual foreign language skills maintenance system and method", discloses displaying a story including soundtrack, text corresponding to sound track in segments, subtitles displayed with audio and video, and selectively pausing playback to allow students to respond. U.S. Pat. No. 5,794,050, entitled "Natural language understanding system", discloses a system for having voice activated commands. U.S. Pat. No. 5,735,693, entitled "Method and device for learning a foreign language", discloses a verbal learning method requiring memorization of conjugations. U.S. Pat. No. 5,606,498, entitled "System for retrieving phrases from generated retrieval word", discloses a handheld translation device. U.S. Pat. No. 5,283,737, entitled "Mechanism for generating linguistic expressions based on synonyms and rules derived from examples", discloses a tool that induces linguistic rules from particular examples. U.S. Pat. No. 5,065,345, entitled "Interactive audio/visual control mechanism" discloses a computer learning system with audio/visual player for language learning. U.S. Pat. No. 6,188,976, entitled "Apparatus and method for building domain specific language models", discloses building of domain specific language models, for speech recognition, which uses the concept of corpus and sub-corpus. U.S. Pat. No. 6,167,398, entitled "Information retrieval system for analyzing Internet documents", discloses such a system. U.S. Pat. No. 6,167,368, entitled "Method and system for identifying significant topics of a document", discloses extraction of lists of simplex noun phrases and processes. U.S. Pat. No. 6,119,114, entitled "Method and Apparatus for Dynamic Relevance Ranking", discloses filtering of incoming documents to screen using predefined profile. U.S. Pat. No. 5,146,405, entitled "Methods for part of speech determination and usage", discloses a database of words likely to appear in a message, looks at adjacent words, does frequency analysis on part of speech. U.S. Pat. No. 5,820,386, entitled "Interactive educational apparatus and method", discloses an interactive CD based learning tool.

SUMMARY OF THE INVENTION

Disclosure of the Invention

The present invention is of a method of and computer software for natural language training, comprising: receiving a plurality of texts in a predetermined natural language; establishing one or more groups of core words of the natural language; and compiling teaching materials that comprise at least a predetermined percentage of words that are within one or more of the groups. In the preferred embodiment, at least one of the groups comprises high frequency words in the natural language, and at least one of the groups comprises high frequency words in a topical domain of the natural language not overlapping with the group comprising the high frequency words in the natural language. Compiling comprises providing to a student one or more of the plurality of texts comprising a percentage of words of the text within one or more of the groups above a predetermined percentage. Displaying one or more of the plurality of texts may be executed with words of the text within one or more of the groups highlighted. One or more of the core words may be a phrase, one or more of the core words may be a plurality of words mapped to a single word, and one or more of the core words may be a linguistic structure or pattern (e.g., a present perfect tense verb or a preposition followed by a noun). Compiling preferably comprises providing to a student a time period's reading assignment which collectively comprise a percentage of words within one or more of the groups above a predetermined percentage.

The invention is also of a method of and software for natural language training, comprising: developing a language core of words from analyzing current sources of language usage; developing programming that utilizes the language core to a predetermined percentage; and analyzing the programming over time to verify that it utilizes the language core to the predetermined percentage. In the preferred embodiment, the language core is determined from a high frequency language set, preferably made of words, phrases, idioms, and collocations. An individual program preferably contains at least 60% of its content from the language core. At least 70% of the language core is utilized over a course of a week's worth of programs, and at least 80% of the language core is utilized over the course of a month's worth of programs. A library of programs is preferably developed from daily programs. The programming is preferably multimedia, preferably supplemented with previews, reviews, transcripts, cultural notes, and/or grammatical notes, and preferably comprising language used in natural settings selected from the group consisting of news, drama, interviews, and topical materials. Programming is preferably made available on a network such as the Internet or an Intranet. Users are enabled to build a customized curriculum by building their own language core. A user's knowledge of the language core is tested and tracked over time. The language core can comprise not only a high frequency set but also a set based on knowledge selected from the group consisting of cultural and historical knowledge.

The invention is further of a method of and software for language teaching, comprising: developing a predetermined language core; and permitting users to analyze texts against the language core to determine its level of applicability to the language core.

The invention is additionally of a method of and software for natural language teaching, comprising: receiving a plurality of texts in a predetermined natural language; establishing a language core that is general in nature; establishing one or more topical language cores; combining the general core and the topical cores to form an overall language core; developing programming that utilizes the overall language core to a predetermined percentage; and analyzing the programming over time to verify that it utilizes the overall language core to the predetermined percentage.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 5 illustrates a possible division of lessons prepared according to the invention to progressively introduce a language to a student to achieve 95% comprehension;

FIG. 15 illustrates LUAT drop down menus.

DESCRIPTION OF THE PREFERRED EMBODIMENTS

Best Modes for Carrying Out the Invention

The present invention comprises a language learning system. However, various features of the present invention are useful for other systems and fields as well. Therefore, such features are not limited to use in language learning systems.

Figure 1:
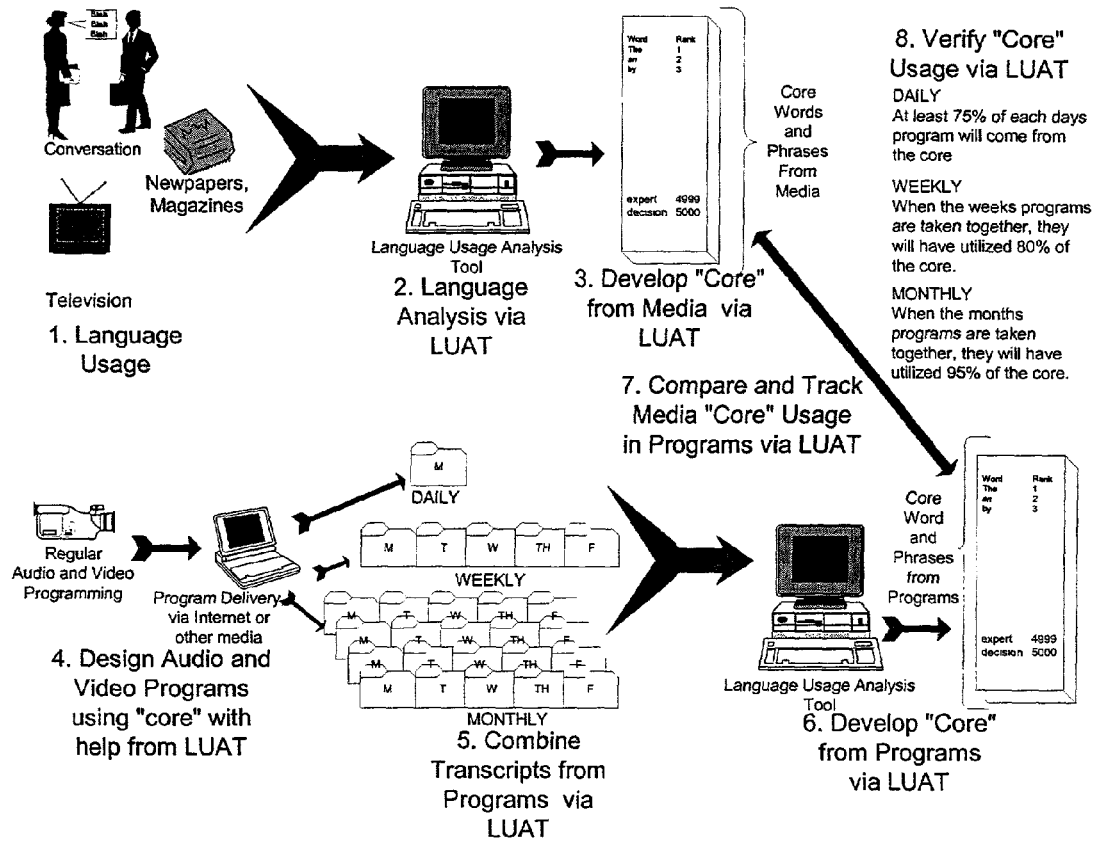
FIG. 1 is a diagram of the overall language system context of the present invention.

The preferred language learning system of the present invention employs a language usage analysis tool ("LUAT"). As shown in FIG. 1, the tool receives as input a plurality of text sources for a given language, such as English language newspaper and magazine articles, television and conversation transcripts, and the like. The most common words and phrases for a targeted audience are identified. Program materials are created (AudioNideo/Text) for learners that have a particular statistical relationships to the "core" words and phrases identified by the tool.

"Text", for purposes of the specification and claims, includes any use of the language, such as newspaper articles, magazines, interviews, television or radio programs, natural speech, and books. Texts are the input(s) to the present invention. "Materials" or "Programs", for purposes of the specification and claims, include audio programs, video programs, transcripts, multimedia programs, and learning aids such as preview, review, cultural notes, and grammar notes. Materials are the output(s) of the present invention.

Figure 8:
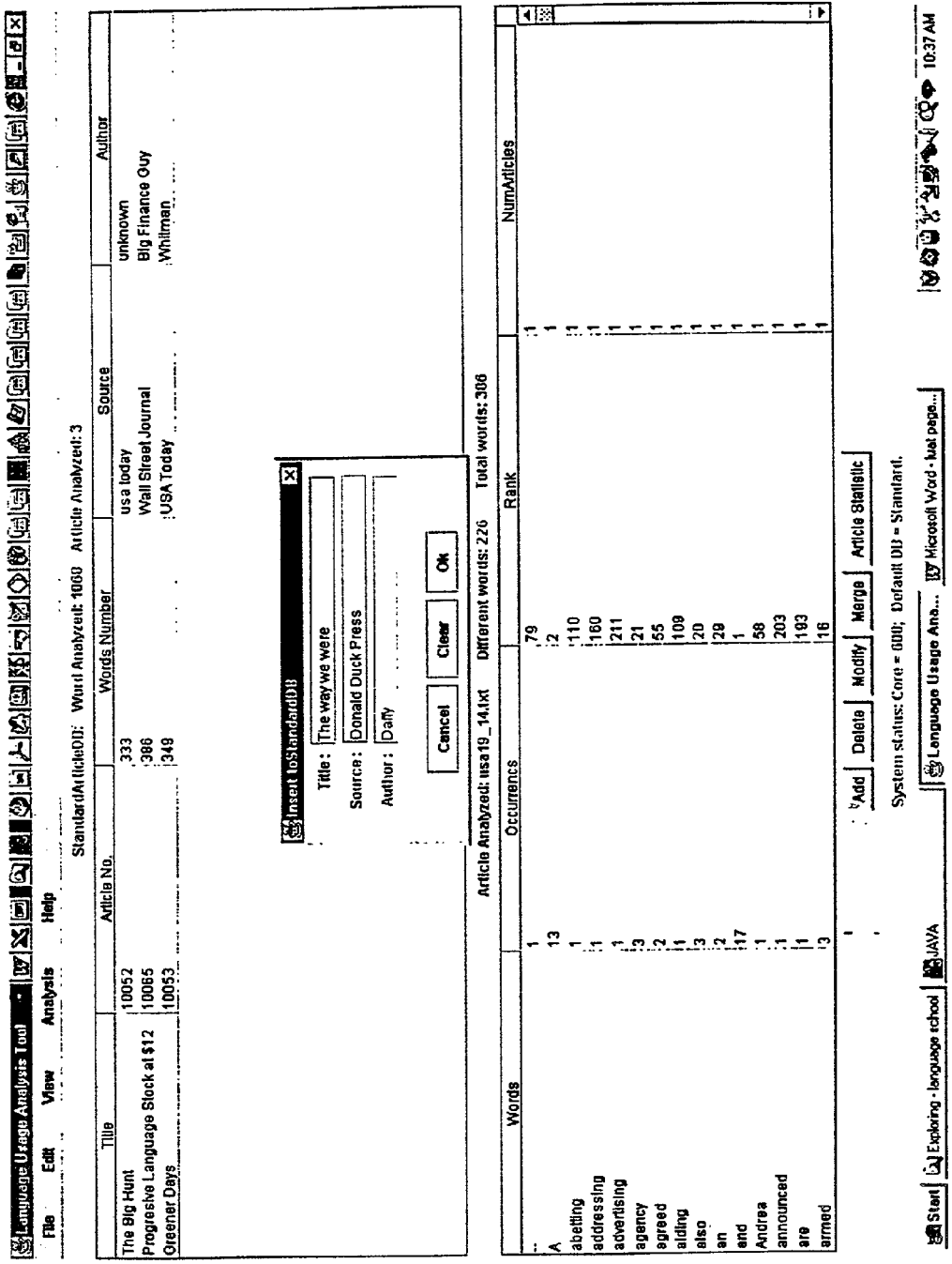
FIG. 8 illustrates insertion of a new article into a database according to the invention.

The LUAT tool preferably incorporates a variety of features including, but not limited to:

1. The ability to input data comprising, for example, verbal data, text data, etc. (see FIG. 8). Such data is optionally input in an electronic digital or analog format. Furthermore, such data is optionally input through a conversion device that converts, for example, sound, text, and/or other information to a computer readable format. Input and/or conversion of such information is accomplished through techniques and equipment known to one of ordinary skill in the art of computers, scanners, voice recognition, telecommunications, computer networking etc. Thus, this embodiment optionally comprises the ability to scan a document, link to an internal and/or external document database, and convert broadcast, recorded, and/or spoken words to suitable input.

Figure 9:
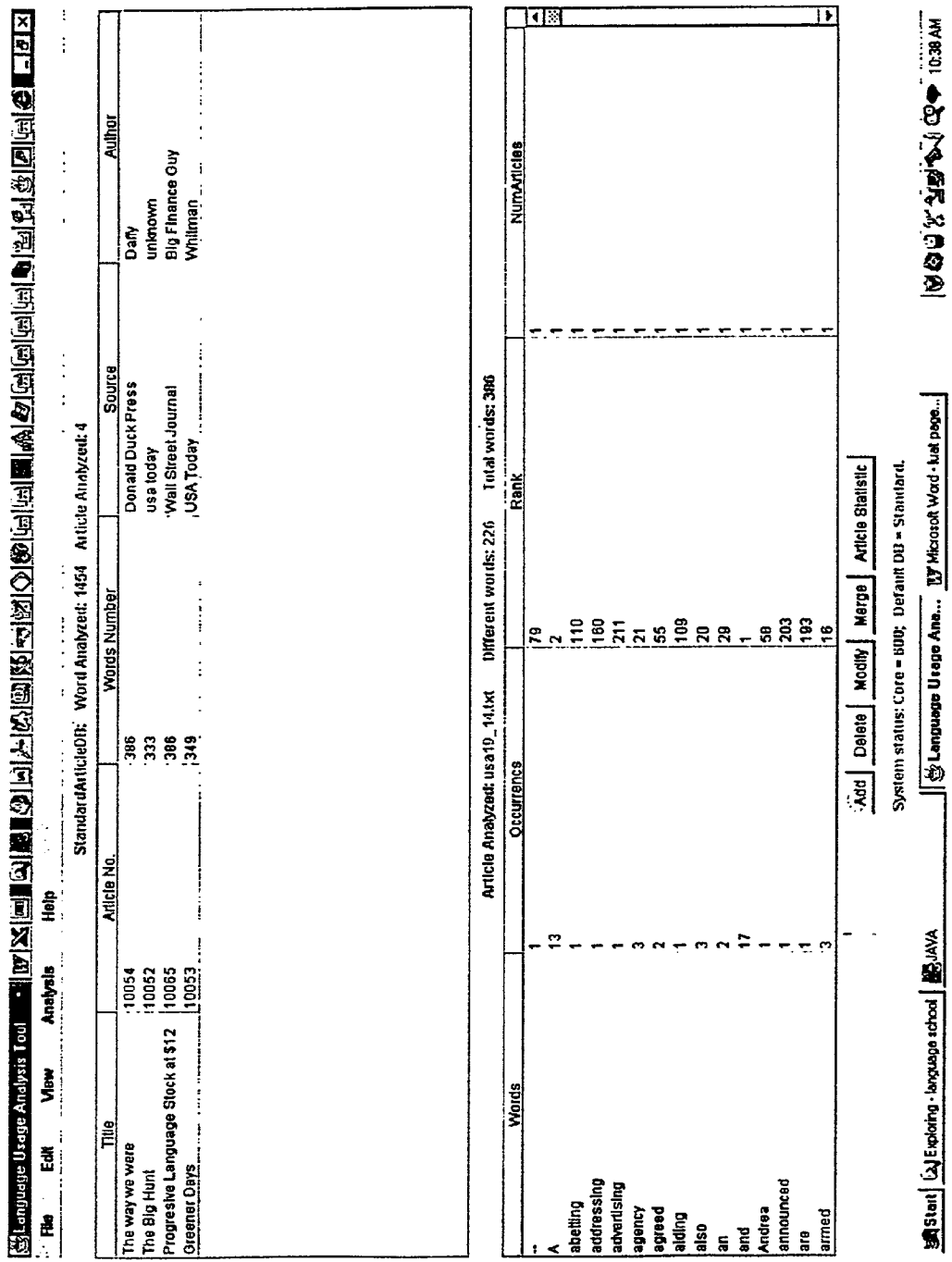
FIG. 9 illustrates the result of insertion of the article into the database.

2. The ability to store input data, for example, but not limited to, the ability store input data in an organized storage, such as in a database (see FIG. 9). For example, the LUAT optionally comprises the ability to sort and/or store documents based on title, author, language (e.g., type and/or usage), date, and/or source. In general, the LUAT comprises the ability to sort and/or store input, and/or other data, within the scope and ability of databases known to one of ordinary skill in the art of computing.

Figure 14:
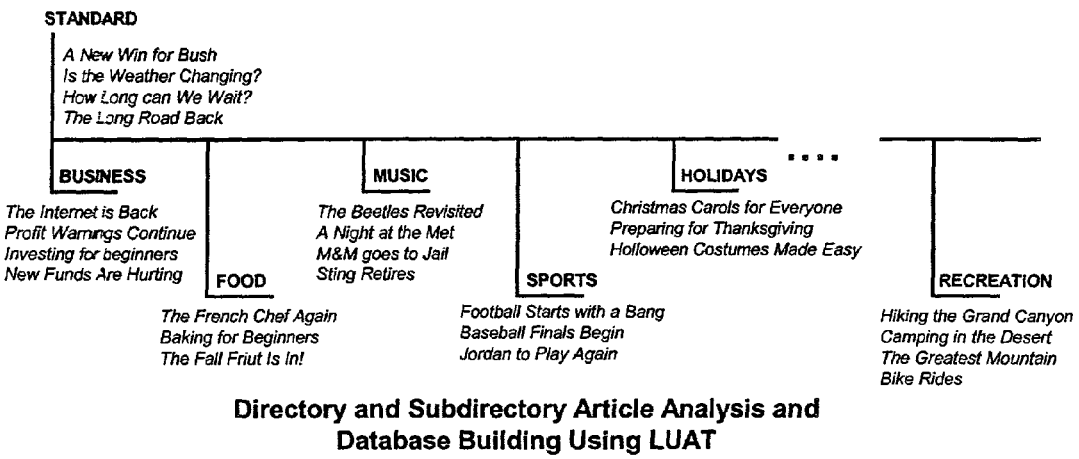
FIG. 14 illustrates the ability of LUAT to analyze a directory of articles.

3. The ability to process entire directories and subdirectories of input data, automatically cataloging the Title, source and author (see FIG. 14).

4. The ability to create and/or use a plurality of databases to store the input data.

Figure 10:
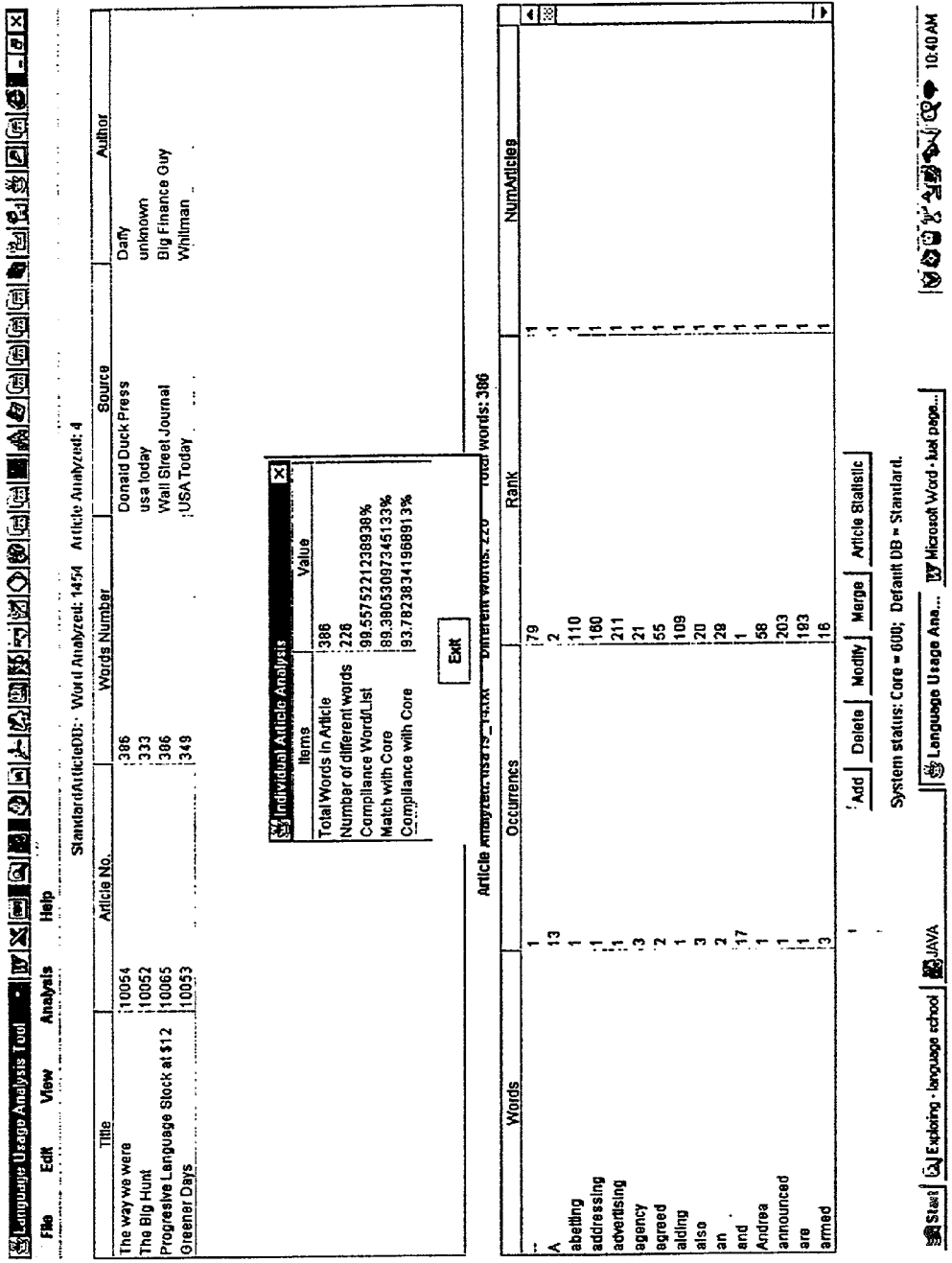
FIG. 10 illustrates analysis of the article according to the invention.

5. The ability to analyze and/or sort input data (see FIG. 10). For example, the LUAT optionally comprises the ability to, for example, but not limited to, compile a list of words, rank words and/or phrases based on occurrence and/or other criteria, rank words and/or phrases based on the number documents in which a word or words appear, and then store the analyzed data in a plurality of databases.

Figure 7:
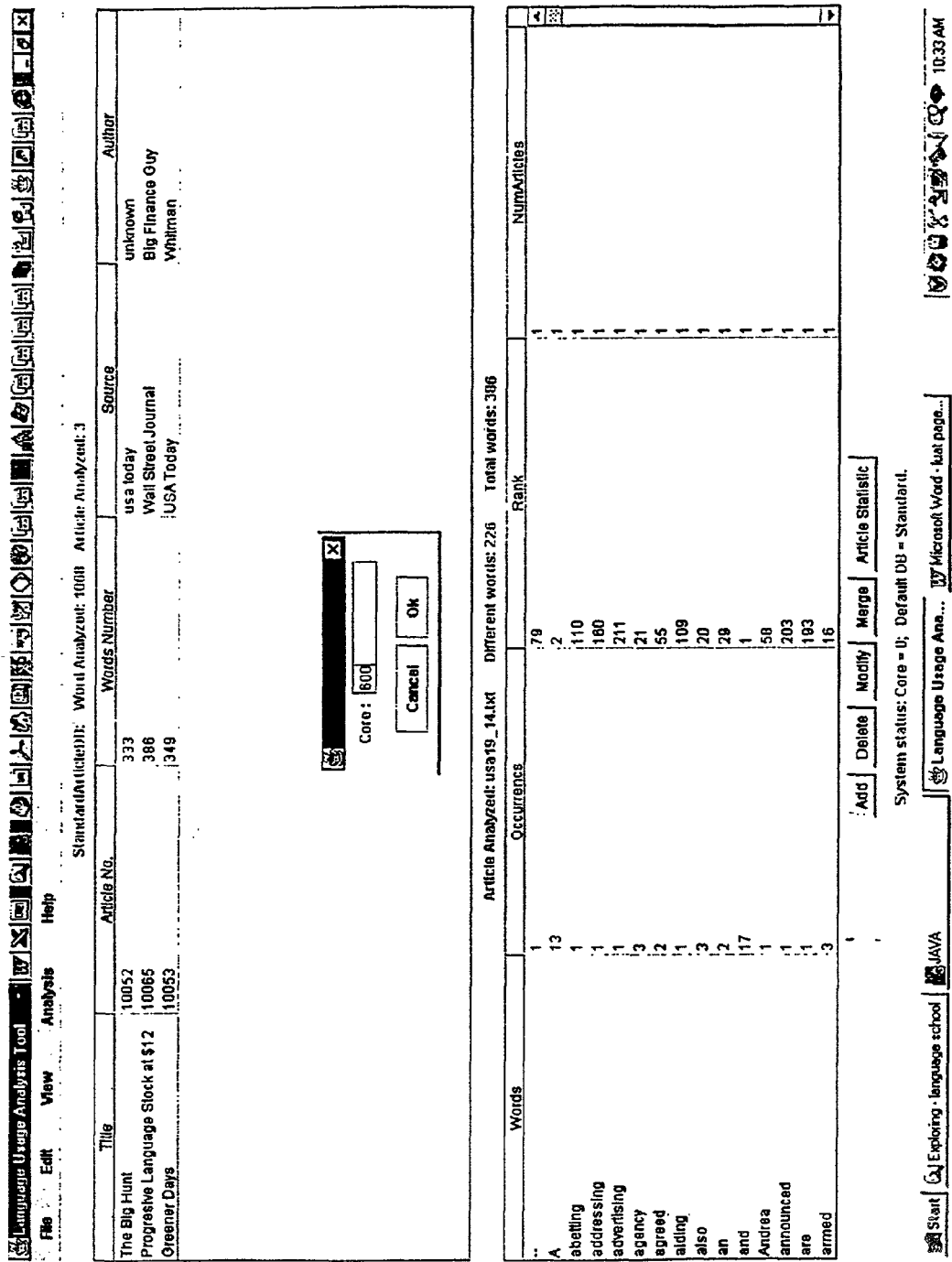
FIG. 7 illustrates selection of a number of words to be considered as core (600 in this example)

6. The ability to select a group of words and/or phrases and define this group as a "core" group of words and/or phrases for some particular purpose. For example, a particular purpose optionally comprises learning the language of a specialized field, learning elementary aspects of a language, learning tenses of a language, learning any specific grammatical construction and/or rule of a language and/or learning regional and/or other dialects of a language and/or finding the most common words, phrases, idioms, or collocations—for example, a high frequency core (see FIG. 7). This particular ability optionally comprises the use of probability, statistics and/or other methods known in the art of linguistics and/or mathematics. Any number may be selected for the core, such as 300, 600 or 5000.

7. The ability to analyze data against the selected group or groups. For example, the LUAT optionally comprises the ability to analyze a document with reference to a selected group or groups wherein the document optionally comprises a document used to create the group or groups and/or a document not used to create the group or groups.

Figure 2:
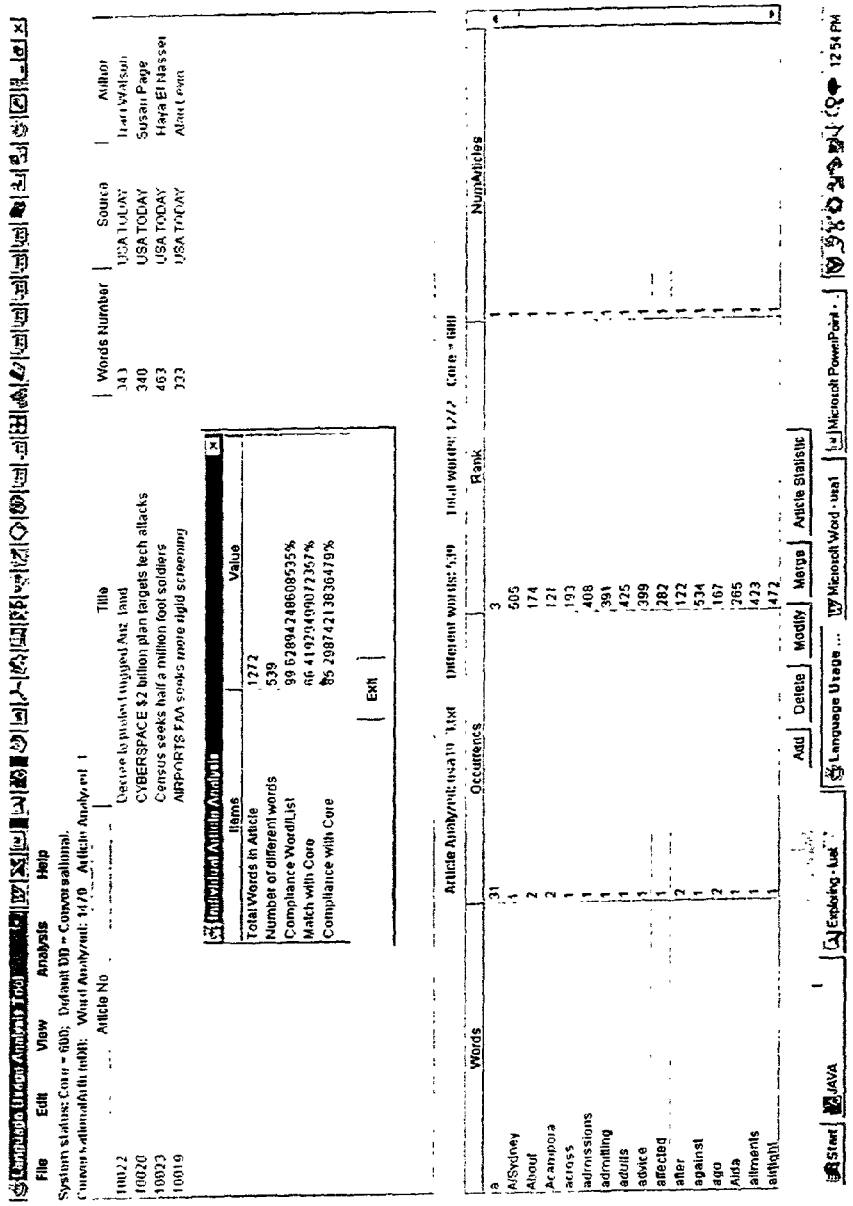
FIG. 2 illustrates results of analysis by the invention of an English-language article against a core of 600 words and phrases.

8. The ability to output statistics regarding data (see FIG. 2). Where data comprises a document, the LUAT optionally comprises the ability to output the number of words in the document, the number of selected group words, the percentage of words in the document that match selected group words, the percentage of documents covered by selected group words repeated, and/or the percentage of words covered by words selected from a database.

Figure 3:
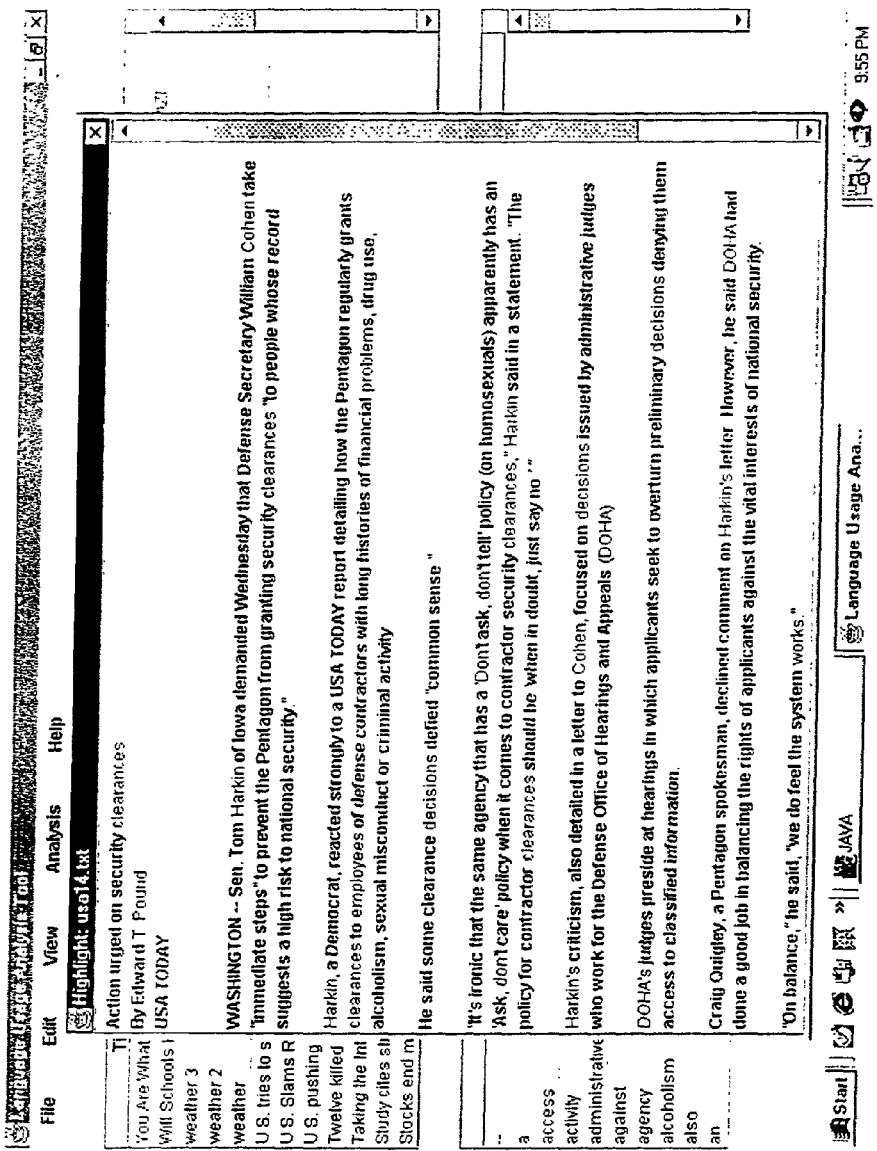
FIG. 3 illustrates an article with core words distinguished in bold face type.

9. The ability to highlight and/or otherwise indicate special significance of any particular word, words, or phrase in a document (see FIG. 3). The LUAT optionally comprises the ability to link any of these particular word, words, or phrases to another database and/or software routine wherein textual translation, audio translation and/or pictorial translation of the word, words, or phrases appears. For example, but not limited to, a link to a picture that is optionally immediately displayed on a computer monitor when a user clicks on a highlighted word. The link optionally comprises statistical and/or other information regarding the word, words, or phrase. The LUAT also optionally comprises the ability to highlight and/or otherwise indicate special significance of any particular word, words, or phrases in comparison to a selected group of words and/or phrases and/or to a database containing words and/or phrases.

10. The ability to output results graphically, for example, but not limited to, word and/or phrase identification versus occurrence.

Figure 11:
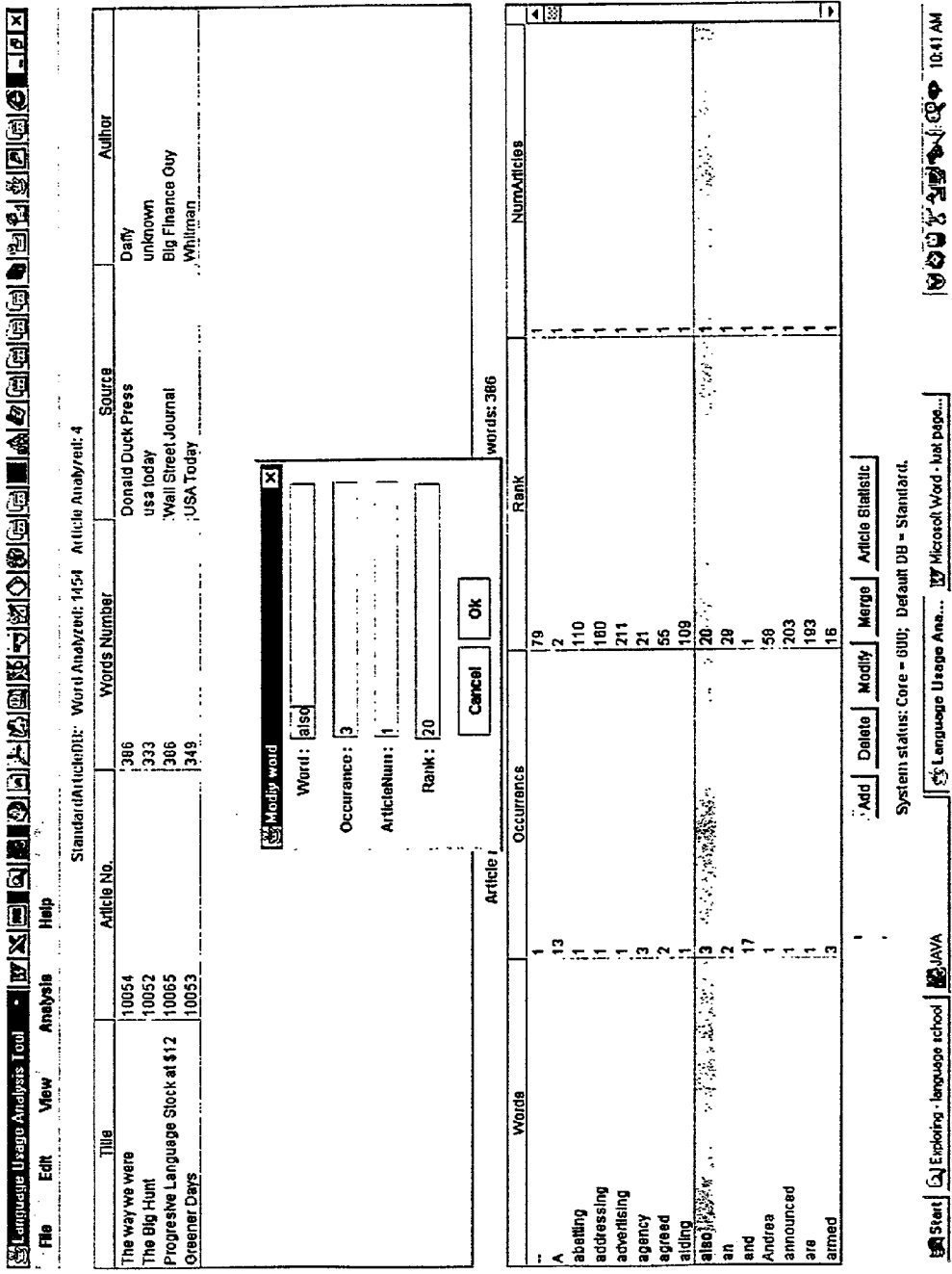
FIG. 11 illustrates modification of characteristics of a word in the database.
Figure 12:
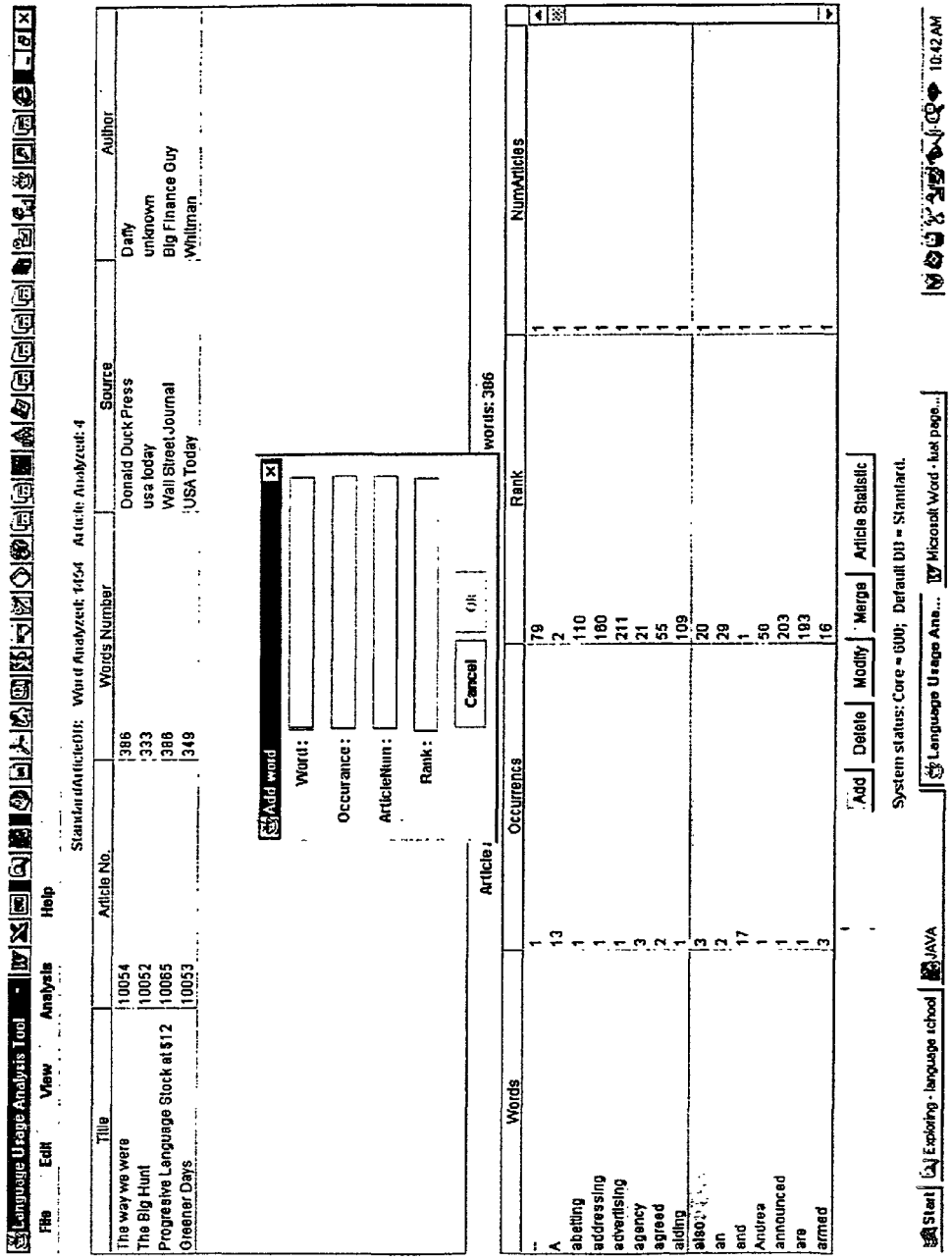
FIG. 12 illustrates the ability to add a word to the database.
Figure 13:
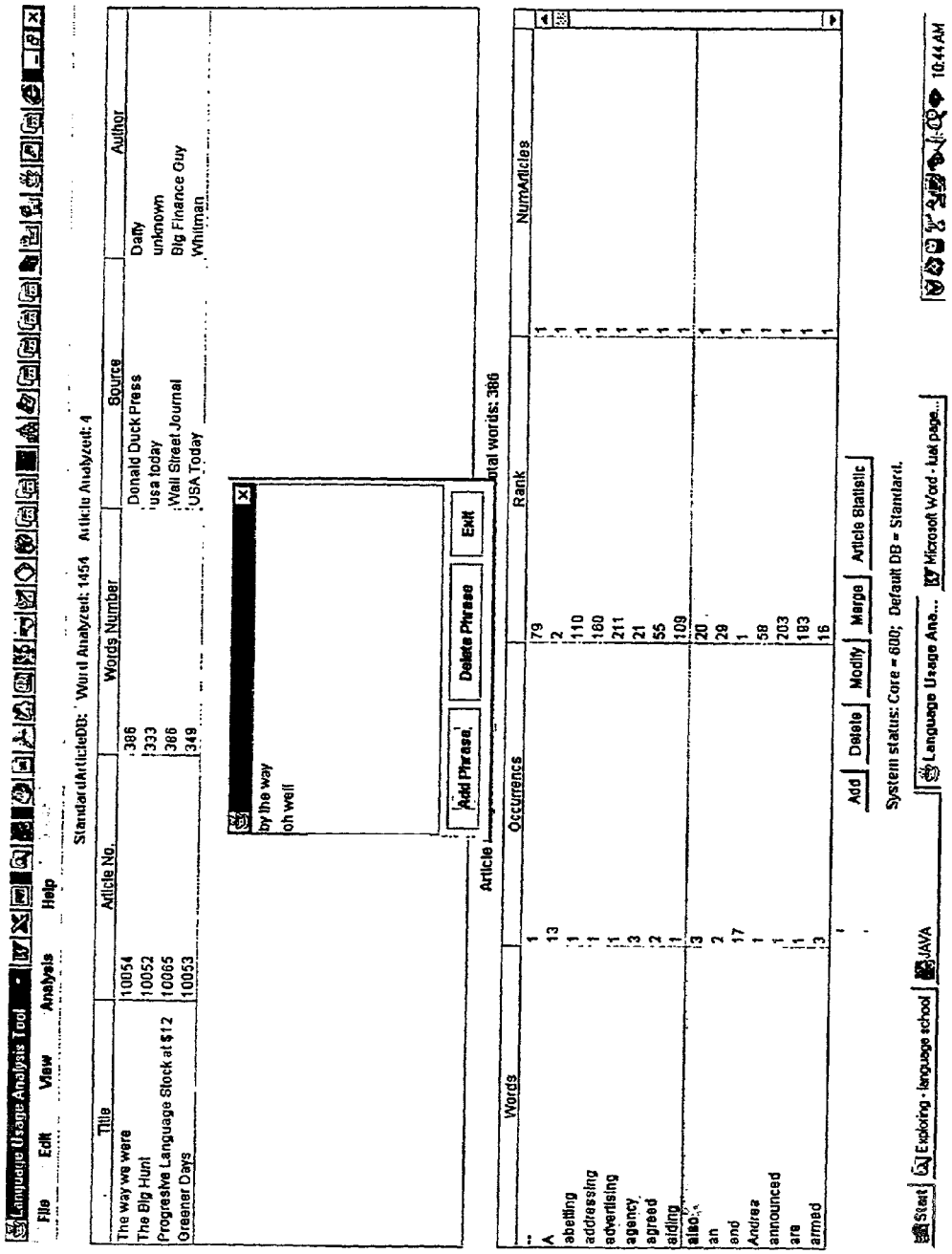
FIG. 13 illustrates ability of the database of the invention to include phrases.

11. The ability to edit and/or scan words and/or phrases in the list or database (see FIGS. 11-13). The LUAT preferably provides for word mapping: i.e., having similar words counted as a root word, for example, "jump", "jumping", and "jumped" could all be counted as three occurrences of "jump". Also, a list of phrases can be entered (such as idioms or collocations), and LUAT will search input data for these phrases, where the phrases will then be analyzed as a unit, and not individual words. For purposes of the specification and claims, "word" is defined to include identified phrases and mapped words. LUAT can read in a text file that contains the mapped words (or phrases list), it can also save the mapping (or phrase list) to a text file.

12. The LUAT optionally comprises the ability to map words by root, whether based on a character match, a translation and/or a combination of both. For example, the Latin root "sol" is optionally selected for a root map. In response, the LUAT selects, scans, and/or otherwise edits and/or translates words in a document to highlight words containing this particular root. Of course, the root is optionally translated to, for example, "sun" (in English), or the document words are translated or otherwise linked to a database or other translation means to facilitate matching of root and word. Words that meet a certain criterion or criteria are optionally translated and/or otherwise marked and/or replaced by, for example, but not limited to, alternative phrases and/or synonyms.

13. Combines (concatenates) text files into a single file (see FIG. 1).

14. Allows comparing and taking the difference between different high-frequency lists, for example, the "core" derived from media sources vs. the core derived from a week or months worth of programming (see FIG. 1).

In one embodiment, the LUAT is programmed in Java and used in conjunction with a commercial database, such as, but not limited to, Microsoft ACCESS. In one embodiment, the LUAT comprises software and/or computer hardware, such as, but not limited to, a general purpose computer known to one of ordinary skill in the art of computers.

The present invention also comprises a progressive language learning method (PLLM). The PLLM optionally comprises any subset of the following:

1. Determination of a "standard" group or core of "high frequency" words and/or phrases using a system such as LUAT, as described herein, such that a certain percentage coverage (for example, approximately 80%) is achieved against a predetermined text set (e.g., news broadcasts or USA Today articles) used in general conversation and reading.

Figure 4:
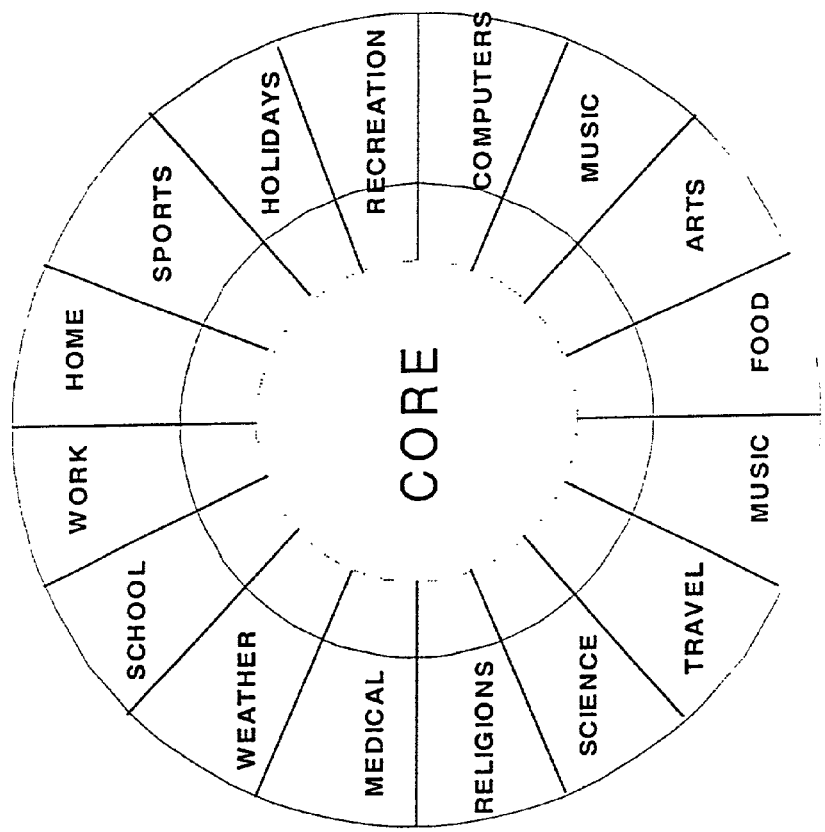
FIG. 4 is a diagram of the model of languages employed by the invention, showing a core of common words and phrases and surrounding sections of words specific to various field of endeavor.
Figure 6:
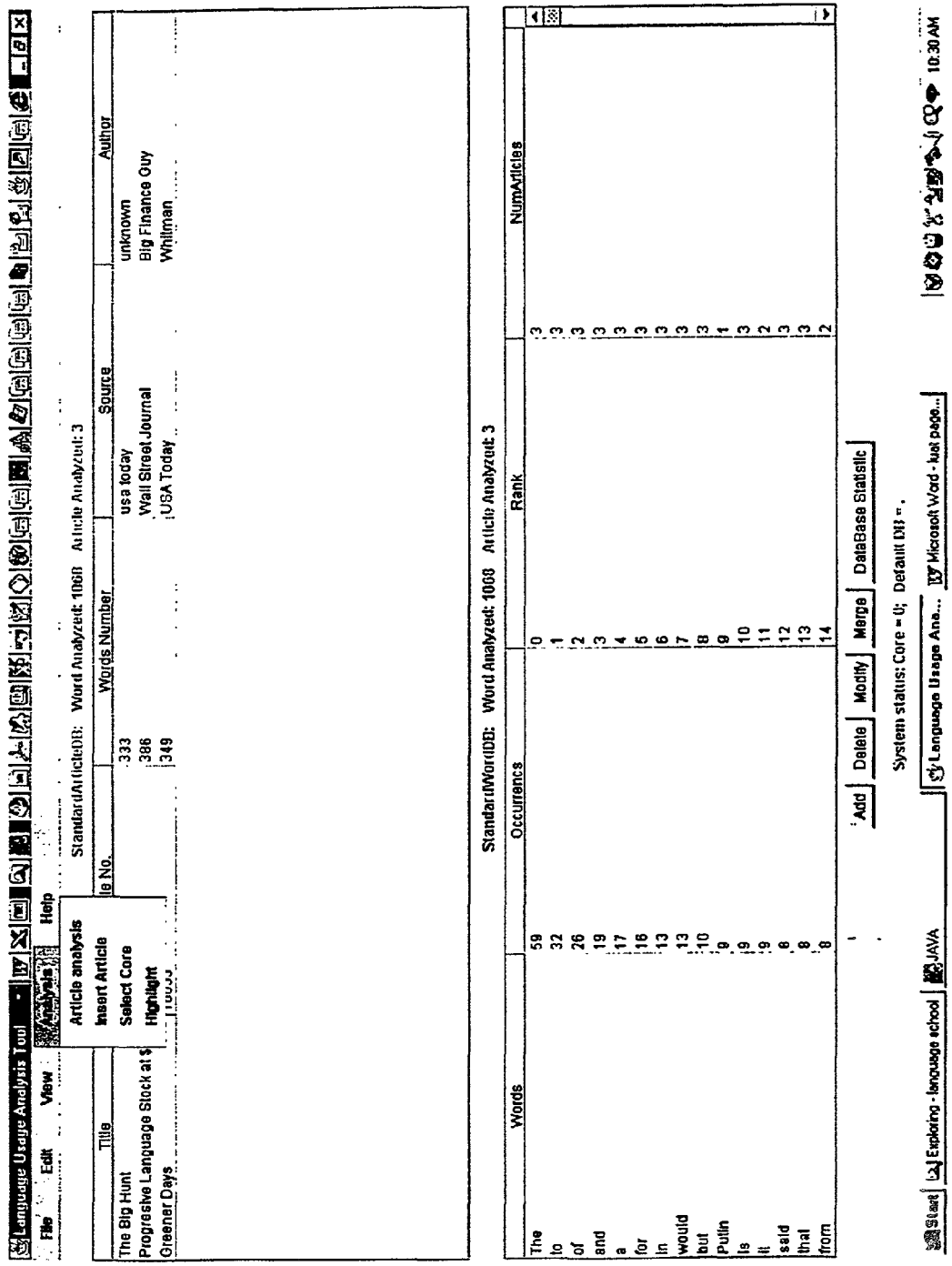
FIG. 6 illustrates the primary analysis tools provided by the present invention.

2. Determination of topical and/or other core groups of "high frequency" words and/or phrases using a system such as LUAT as described herein. For example, a specific topical core optionally comprises approximately 100 to approximately 200 words. These words are optionally selected through use of a system such as LUAT and incorporated into learning media. The learning media, in turn, is optionally used to instruct a student or students. A desired goal is achievement of a predetermined level of mastery of the core group words within a predetermined period of time or other criterion. FIG. 4 shows an embodiment wherein "standard" core and "topical" cores are configured in relationship to each other.

3. Determination of a Super Core that combines one or more of the core groups of high frequency words. (see FIG. 4), For example the standard "core" of 5000 words combined with one or more topical "cores", such as business.

4. Determination of linguistic and/or other characteristics of learners at a plurality of learning levels based on, for example, but not limited to, grammar, speed, tenses, content density, etc.

5. Design of topical and/or learning materials (video, audio, text or multimedia based), for expression in learning media, which incorporate selected words from at least one group, core, or super core etc. (see FIG. 5). In addition, the appropriate linguistic characteristics for the target audience as determined in No. 4 above are utilized. For example, a learning program optionally comprises a design based on technical words and/or phrases and elementary words and/or phrases. Such a design promotes language learning of a student for a particular purpose or purposes. The design of learning materials optionally comprises interactive features wherein progress and further design are optionally based on student input. Intelligent systems that administer standardized test, for example, are useful in the interactive design of learning programs. Such intelligent systems are optionally seamlessly integrated into a learning program whereby a student has no particular awareness of the operation of the intelligent system and its effect on learning program modifications. In one embodiment, the PLLM optimizes (and/or maximize) use of words and/or phrases from at least one group, core, etc. Through interaction, preprogramming and/or other techniques, the percentage of words and/or phrases that appear in a learning program are optionally varied. For example, a program optionally comprises approximately 90% core and/or topical core words. The learning program optionally allows for cadence and/or speed control, such that speech can be slowed down to facilitate learning. Another option allows for use of words in context in, for example, a cultural setting.

6. A daily, or weekly, immersion program that focuses on core words, linguistic features, and selected topics is optionally available to the user. The daily, or weekly, program typically contains news, drama, music, holidays and traditions, and topical (sports, business, food, etc.) segments. Preferably, programs are designed such that at least 60% (most preferably at least 75%) of the words and phrases of each day's programming come from the core and/or topical core words. In addition, when a week's worth of programs are combined, they will have preferably utilized 70% (most preferably at least 80%) of the words and phrases from the core and/or topical core. When a month's worth of programs are combined, they preferably will utilize at least 80% (most preferably at least 95%) of the core and/or topical core.

7. The learning program optionally comprises a library with a specific focus on topical words and cultural issues.

8. The learning program comprises the ability to combine various features to provide an individualized immersion experience. For example, the library is optionally combined with a daily program for learning language, culture, and context, thereby facilitating the learning experience.

9. The learning program either provides directly, or indirectly, complementary study material, such as, but not limited to, preview exercises, review exercises, quizzes, grammatical and cultural notes, and a full text view of each program module. The material is classifiable into a plurality of skill levels to facilitate learning.

10. A combination of elements, modules, and/or features is possible to enhance mastery of core and/or topical core materials as well as highlight context, culture and customs. The user may optionally compose a custom program, for example, but not limited to, learning of common core via daily broadcast and supplement of core only in areas of most interest, e.g., business, science, art or a variety of other areas.

11. Optional selection of focus on listening, reading, and/or speaking skills. In one embodiment, the PLLM focuses primarily on listening, then reading, and then speaking skills. However, the PLLM is not limited to this hierarchy as any individual skill or combination of skills are selectable and useful for design of a learning program. In general, the PLLM is flexible enough to adapt to any variety of theories of language learning known in the art of linguistics, including, but not limited to, remedial learning, learning of the physically and/or mentally impaired, and foreign language learning.

12. Learning media wherein the learning media optionally provides for an immersion type of experience. Such learning media encompasses all types of media known in the art of broadcast and/or language instruction (e.g., video, audio, written, etc.). For example, the PLLM optionally comprises topical videos and/or a daily broadcast. In one PLLM embodiment, the learning media promote mastery of a select group of words and/or phrases, e.g., a core group. Again, any such group is based on any conceivable criteria, including, but not limited to; usage, learning level, and/or field of use. Additionally, excerpts of natural language (for example an interview) may be combined with created programming.

Of course, it is apparent that the PLLM and LUAT are useful in fields other than language learning. For example, PLLM and LUAT are useful in any field in which linguistics serves as an aid to understanding and/or discovering language related phenomena. PLLM and/or LUAT are useful, for example, but not limited to, learning and/or studying the language of a specific field (e.g, legal, ethnic, regional, government and/or international relations, conflict, etc.).

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of natural language training, the method comprising the steps of:
   selecting a plurality of texts in only a single predetermined natural language;
   automatically analyzing the plurality of texts to compile a list of words and phrases sorted by one or more characteristics;
   establishing from the list one or more groups of core words of the same natural language; and compiling teaching materials in the same natural language that comprise at least a predetermined percentage of words that are within one or more of the groups.

2. The method of claim 1 wherein at least one of the groups comprises high frequency words in the natural language.

3. The method of claim 2 wherein at least one of the groups comprises high frequency words in a topical domain of the natural language not overlapping with the group comprising the high frequency words in the natural language.

4. The method of claim 1 wherein the compiling step comprises providing to a student one or more of the plurality of materials comprising a percentage of words of the materials within one or more of the groups above a predetermined percentage.

5. The method of claim 4 additionally comprising the step of displaying one or more of the plurality of materials with words within one or more of the groups of core words.

6. The method of claim 1 wherein one or more of the core words comprises a structure selected from the group consisting of phrases, linguistic structures, and linguistic patterns.

7. The method of claim 1 wherein one or more of the core words comprises a plurality of words mapped to a single word.

8. The method of claim 1 wherein the compiling step comprises providing to a student a time period's materials which collectively comprise a percentage of words within one or more of the groups above a predetermined percentage.

9. A method of natural language training, the method comprising the steps of:
developing a language core of words in only a single natural language from automatically analyzing current sources of language usage for one or more characteristics;
developing material in the same natural language that utilizes the language core to a predetermined percentage; and
analyzing the material over time to verify that it utilizes the language core to the predetermined percentage.

10. The method of claim 9 wherein the language core is determined from a high frequency language set.

11. The method of claim 10 wherein the high frequency set is made of one or more structures selected from the group consisting of words, phrases, linguistic structures, linguistic patterns, idioms, and collocations.

12. The method of claim 9 wherein an individual program will contain at least 60% of its content from the language core.

13. The method of claim 9 that utilizes at least 70% of the language core over a course of a week's worth of programs.

14. The method of claim 9 that utilizes at least 80% of the language core over the course of a month's worth of programs.

15. The method of claim 9 additionally comprising the step of developing a library of programs from daily programs.

16. The method of claim 9 wherein the programming is multimedia.

17. The method of claim 16 additionally comprising the step of supplementing the multimedia programming with materials selected from the group consisting of previews, reviews, transcripts, cultural notes, and grammatical notes.

18. The method of claim 16 wherein the multimedia programming comprises language used in natural settings selected from the group consisting of news, drama, interviews, and topical materials.

19. The method of claim 9 additionally comprising the step of making the programming available on a network selected from the group consisting of the Internet and Intranets.

20. The method of claim 9 additionally comprising the step of enabling a user to build a customized curriculum by building their own language core.

21. The method of claim 9 additionally comprising the step of testing and tracking a user's knowledge of the language core over time.

22. The method of claim 9 wherein the language core comprises not only a high frequency set but also a set based on knowledge selected from the group consisting of cultural and historical knowledge.

23. A language program comprising:
computer software stored on a computer-readable medium for automatically developing a language core with one or more characteristics from only a single predetermined natural language; and
computer software stored on a computer-readable medium which permits users to analyze texts in the same natural language against the language core to determine its level of applicability to the language core.

24. A method of natural language teaching, the method comprising the steps of:
providing computer software stored on a computer-readable medium for receiving and automatically analyzing for one or more characteristics a plurality of texts in only a single predetermined natural language to create an ordered list of words and phrases;
establishing a language core from the ordered list in the same natural language that is general in nature;
establishing one or more topical language cores from an ordered list developed by automatically analyzing a different plurality of texts in the same natural language;
combining the general core and the topical cores to form an overall language core;
developing programming in the same natural language that utilizes the overall language core to a predetermined percentage; and
analyzing the programming over time to verify that it utilizes the overall language core to the predetermined percentage.

* * * * *